Patented Oct. 28, 1930

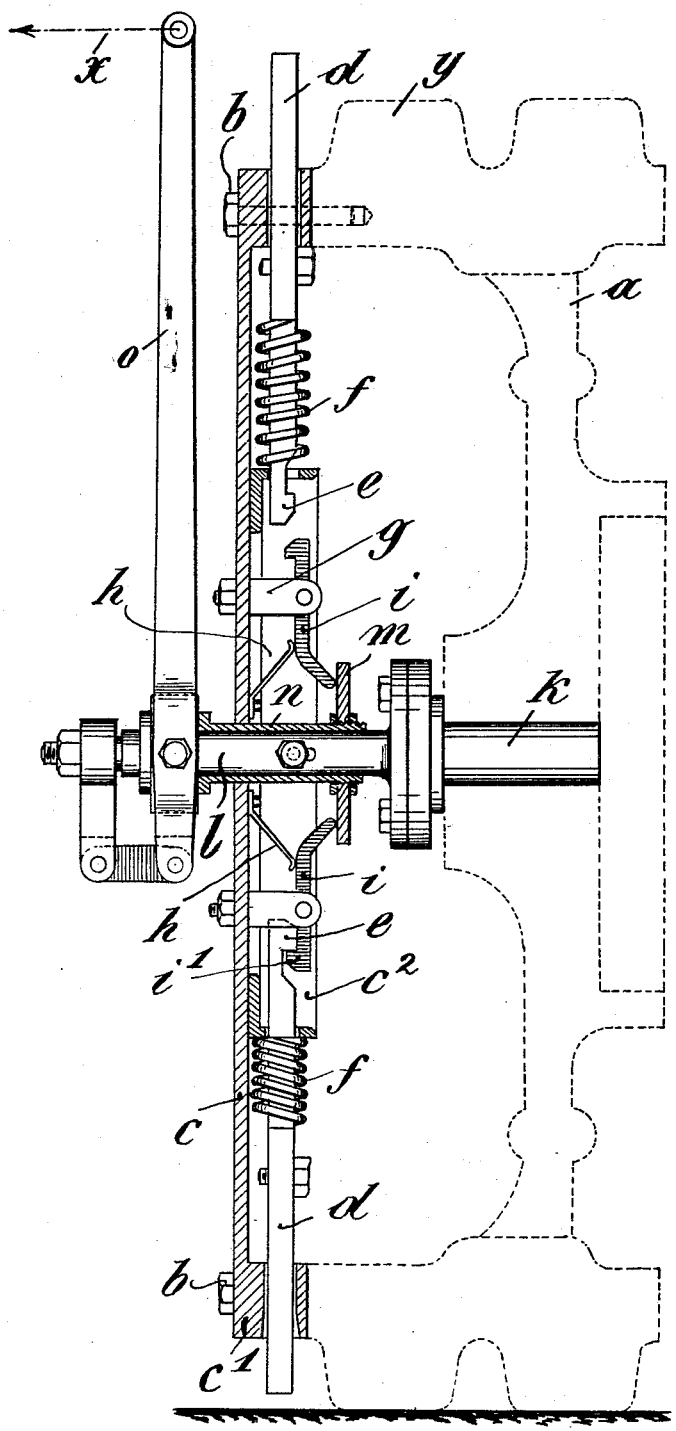
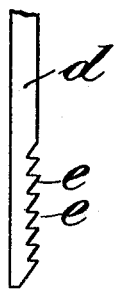

1,779,909

UNITED STATES PATENT OFFICE

MAX HAAGEN, OF BERLIN-CHARLOTTENBURG, GERMANY

NONSKID WHEEL

Application filed August 21, 1929, Serial No. 387,493, and in Germany October 24, 1928.

My invention relates to non-skid wheels for automobiles and more particularly has reference to means for operating radially shiftable spikes of such wheels.

In driving on roads which have become slippery from traffic, rain or ice, sand is usually deposited under the wheels to prevent skidding. Sand, however, frequently is not at hand when required and, besides, is a very unsatisfactory non-skid means.

It has been proposed, therefore, to provide other, more efficacious non-skid means. Spring-influenced spikes or claws have been proposed which are radially shiftably arranged on the driving wheels and are shifted outward by means of an operating member shiftable on the wheel axle and manipulated from the driver's seat. When in operative position, spikes of this type or their operating members often break in two under the action of the weight of the car when hitting a solid obstacle in driving.

Another proposal provides spikes which are shifted into operative position by means of a curved member and held in this position by ratchet teeth mounted on the spikes and corresponding pawls mounted on the rim of the wheel. This device also suffers from the disadvantage of the ratchet teeth or the pawls breaking under the action of the weight of the car when hitting an obstacle.

The present invention has for its object the solution of this problem, which object is obtained by having the inner ends of the spikes designed so as to form hooks adapted to be engaged by pawls pivoted on the wheel body and to be disengaged by means of a disk which is shifted through the intermediary of a lever system. When released in this manner by these pawls, the spikes automatically move outward under spring action and when hitting an obstacle or merely the road itself, recede in a radial direction so as to give way to the obstacle. When the lever system and the disk are released, each spike when receding is prevented from projecting again by its pawl until the disk is operated anew by the lever system.

In order that my invention may be more easily understood, a preferred embodiment of my improved non-skid arrangement is illustrated by way of example in the drawing in which—

Figure 1 is a diametrical section through the arrangement in connection with a wheel shown in dotted lines, while Figure 2 is a detail showing a slight modification.

Referring to Figure 1, $a$ is the wheel which has mounted on its front side, by screw bolts $b$, a circular disk $c$ on which radially or slightly tangentially guided bar-shaped spikes $d$ are shiftably arranged. These spikes $d$ are guided in the rim $c^1$ and in an inner ring $c^2$ fixed on disk $c$ and are each under the action of a spring $f$, the strength of which is determined according to the load carried by the wheel. The inner ends of the spikes $d$ each form a hook $e$. Each hook $e$ has a pawl lever $i$ cooperating therewith, which levers are mounted on disk $c$ toward its center in brackets $g$, the inner arm of each lever $i$ being under the action of a spring $h$ while the outer arm forms a hook $i^1$ adapted to engage hook $e$ of the appurtenant spike. An extension $l$ of the wheel journal $k$ carries a sleeve $n$ provided with a stop collar or ring $m$ which sleeve can be reciprocated along extension $l$ from the driver's seat by means of a lever system $o$, as shown.

On a normal road where no non-skid means are required, all spikes $d$ are in their inner position and are held therein by the hooks $i^1$ of the lever $i$ engaging their hooks $e$. When skidding is to be prevented, lever $o$ is simply thrown over in the direction of arrow $x$ whereby sleeve $n$ with disk $m$ is shifted to the left and all levers $i$ are swung against the action of their springs $h$ and release the spikes $d$ which are projected in unison outward under the action of their springs $f$ into operative position. In this position their outer ends project beyond the tread surface $y$ of the tire. In the same measure as the spikes $d$ touch or penetrate into the ground, they exert a non-skid action upon the wheels. When arriving about in a vertical position relatively to the road, especially if the latter is hard enough, the spikes shift inward and then outward again during the revolution of the wheel as long as disk $m$ is held in operative position. When disk $m$ is shifted back to the position of rest, as illustrated, the spikes $d$ successively are shifted inward until their hooks $e$ again engage the hooks $i^1$ of the levers $i$, all spikes thus being shifted to inoperative position during one revolution of the wheel. In this position they scarcely touch the road even with a slack tire.

Owing to the rubber tires wearing out in the course of time, the spikes $d$ will eventually move inward farther than required for the correct mutual engagement of the hooks $e$ and $i^1$. To secure a reliable retention of the spikes in this case also, a series of hooks or ratchet teeth, $e, e$ is advantageously provided on each spike instead of a single hook, as illustrated in Figure 2, the hook $i^1$ of each lever $i$ having a corresponding shape. The spikes then are correctly engaged by the appurtenant hook $i^1$, no matter how far the spikes are shifted inward on disk $c$.

What I claim and desire to secure by Letters Patent, is:—

A non-skid wheel comprising radially shiftable spikes, springs adapted to shift them into operative position, at least one ratchet tooth on each of said spikes, pawls pivotally mounted on the wheel body and each adapted to engage the tooth of one of said spikes, an actuating member common to all said pawls, and a lever system adapted to actuate said member.

The foregoing specification signed at Berlin this 7th day of August, 1929.

MAX HAAGEN.